United States Patent [19]
Fujita

[11] Patent Number: 5,625,760
[45] Date of Patent: Apr. 29, 1997

[54] IMAGE PROCESSOR FOR PERFORMING VOLUME RENDERING FROM VOXEL DATA BY A DEPTH QUEUING METHOD

[75] Inventor: Hiroyuki Fujita, Kanagawa, Japan

[73] Assignee: Sony Corporation, Tokyo, Japan

[21] Appl. No.: 255,432

[22] Filed: Jun. 8, 1994

[30] Foreign Application Priority Data

Jun. 25, 1993 [JP] Japan ................................... 5-179765

[51] Int. Cl.$^6$ ................................................ G06T 17/00
[52] U.S. Cl. ................................................ 395/124
[58] Field of Search ................................... 395/124, 119, 395/123

[56] References Cited

U.S. PATENT DOCUMENTS

5,025,375  6/1991  Sugawara ........................ 395/124 X
5,101,475  3/1992  Kaufman et al. ...................... 395/124
5,345,490  9/1994  Finnigan et al. ................... 395/124 X Primary Examiner—Phu K. Nguyen
Assistant Examiner—Cliff N. Vo
Attorney, Agent, or Firm—Limbach & Limbach L.L.P.

[57] ABSTRACT

An image processor adapted to perform a volume rendering operation from voxel data by a depth queuing method, comprising a three-dimensional memory for storing the voxel data therein, a plurality of three-dimensional address generators for generating addresses to read out the data from the three-dimensional memory, and a plurality of pixel calculators for processing the read-out data from the three-dimensional memory by the depth queuing method. The memory consists of a fast accessible one such as a static RAM. The required calculation time can be shortened to expedite the volume rendering operation, and a high-speed process is achieved due to the use of such a fast accessible memory.

4 Claims, 4 Drawing Sheets

OUTPUT BUFFER

VOXEL DATA $L = \sqrt{3}\,d$

FIG. 6
PRIOR ART

IMAGE PROCESSOR FOR PERFORMING VOLUME RENDERING FROM VOXEL DATA BY A DEPTH QUEUING METHOD

BACKGROUND OF THE INVENTION

1. Field of the Invention

The present invention relates to an image processor adapted to perform volume rendering from voxel data by a depth queuing method.

2. Description of the Related Art

In the medical field, it is known that cross-sectional data (two-dimensional image) of a body structure is obtained by the use of a CT (computed tomography) apparatus or an MRI (magnetic resonance imaging) apparatus. The data thus obtained is transformed into (x, y) plane data. A plurality of frames of data can be acquired by parallelly displacing the position of the cross section. With the normal direction of the cross section taken along the z-axis, such plural frames of the data can be regarded as three-dimensional data (x, y, z). Since the resolution in the z-axis direction is lower than that in the cross-section data (x, y), it is generally customary to execute an interpolation to attain mutual adjustment of the resolutions. Such data having values in the entire three-dimensional space are termed boxel data.

A technique of forming a stereographic two-dimensional image from voxel data (three-dimensional data) is termed volume rendering. The depth queuing method is one art included in such volume rendering. The fundamental concept of the depth queuing method resides in achieving stereoscopic reality by lightening a portion near the viewpoint while darkening a portion far therefrom.

Now a consideration is given to a technique of applying the depth queuing method to medical voxel data acquired by the use of a CT or MRI apparatus as mentioned. In medical data, there exists a constant correlation between a luminance value and a biological structure. For example, the contour of a face can be obtained stereoscopically through volume rendering of the data representative of skin by the depth queuing method.

Hereinafter an exemplary algorithm of the depth queuing method will be described.

First an explanation will be given on the volume rendering of voxel data in the z-axis direction. In this case, data D (x, y, z) are acquired in the z-axis direction sequentially by changing the value z with respect to one set of (x, y), and a check is executed as to whether the value of each of the data D (x, y, z) is between predetermined thresholds TH1 and TH2. If the result of such a check signifies that the data D (x, y, z) is between the thresholds TH1 and TH2, a value (zmax−z) is stored at an address (x, y) in an output buffer where the result of the volume rendering is to be written. The value zmax denotes the maximum in the z-axis direction. The volume rendering from the z-axis direction can be performed by repeatedly executing the above operation with respect to the set (x, y).

Figure 5:
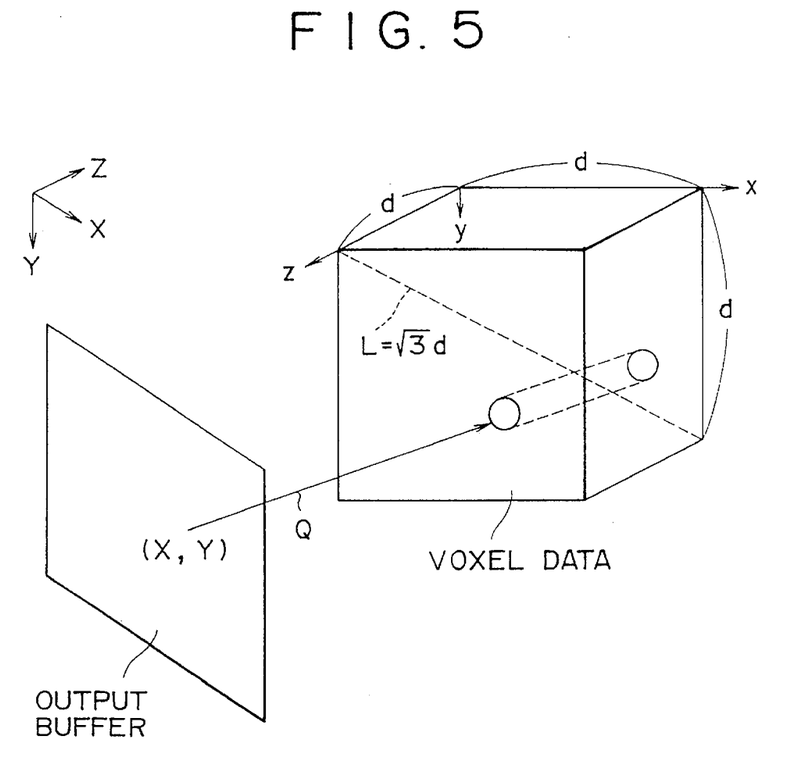
FIG. 5 is an explanatory diagram illustrating execution of volume rendering from an arbitrary direction.

Volume rendering of voxel data from an arbitrary direction is performed in the following manner. Suppose now that the positional relationship shown in FIG. 5 is existent between the voxel data (original data) and the output buffer where the result of the volume rendering is written. In this case, the normal direction of the output buffer becomes coincident with a sight-line direction, i.e., a depth queuing direction (indicated by an arrow Q).

There are two methods selectable for volume rendering of the voxel data from an arbitrary direction, i.e., by rotating the voxel data while fixing the sight line, or by rotating the sight line while fixing the voxel data. More specifically, selection of either of such two methods is dependent on which of the two coordinate systems (x, y, z) or (X, Y, Z) shown in FIG. 5 is adopted for execution of calculations. Hereinafter an explanation will be given on the former method which rotates the voxel data while fixing the sight line. It is assumed here that the center of rotation is coincident with the center of the voxel data.

In the depth queuing, the line of the voxel data D (x, y, z) is used in the normal direction with respect to a point in the output buffer. Supposing that the voxel data has a size of d×d×d, the address of the line of the voxel data D (x, y, z) in the normal direction with respect to the point (X, Y) in the output buffer is calculated according to Eq. (1) shown below, wherein the variable Z changes within a range of $-L/2 < Z < L/2$; $L = d\times\sqrt{3}$; and $\alpha$, $\beta$ and $\gamma$ denote rotation angles on the x-axis, y-axis and z-axis, respectively.

$$\begin{bmatrix} x \\ y \\ z \end{bmatrix} = A \begin{bmatrix} X - L/2 \\ Y - L/2 \\ Z - L/2 \end{bmatrix} + \begin{bmatrix} d/2 \\ d/2 \\ d/2 \end{bmatrix} \quad \text{Eq. (1)}$$

$$A = A_X^{-1} A_Y^{-1} A_Z^{-1} = \begin{bmatrix} A_{00} & A_{01} & A_{02} \\ A_{10} & A_{11} & A_{12} \\ A_{20} & A_{21} & A_{22} \end{bmatrix}$$

$$A_X = \begin{bmatrix} 1 & 0 & 0 \\ 0 & \cos\alpha & -\sin\alpha \\ 0 & \sin\alpha & \cos\alpha \end{bmatrix} \quad A_X^{-1} = \begin{bmatrix} 1 & 0 & 0 \\ 0 & \cos\alpha & \sin\alpha \\ 0 & -\sin\alpha & \cos\alpha \end{bmatrix}$$

$$A_Y = \begin{bmatrix} \cos\beta & 0 & \sin\beta \\ 0 & 1 & 0 \\ -\sin\beta & 0 & \cos\beta \end{bmatrix} \quad A_Y^{-1} = \begin{bmatrix} \cos\beta & 0 & -\sin\beta \\ 0 & 1 & 0 \\ \sin\beta & 0 & \cos\beta \end{bmatrix}$$

$$A_Z = \begin{bmatrix} \cos\gamma & -\sin\gamma & 0 \\ \sin\gamma & \cos\gamma & 0 \\ 0 & 0 & 1 \end{bmatrix} \quad A_Z^{-1} = \begin{bmatrix} \cos\gamma & \sin\gamma & 0 \\ -\sin\gamma & \cos\gamma & 0 \\ 0 & 0 & 1 \end{bmatrix}$$

$A_{00} = \cos\beta \times \cos\gamma$
$A_{01} = \cos\beta \times \sin\gamma$
$A_{02} = -\sin\beta$
$A_{10} = -\cos\alpha \times \sin\gamma + \sin\alpha \times \sin\beta \times \cos\gamma$
$A_{11} = \cos\alpha \times \cos\gamma + \sin\alpha \times \sin\beta \times \sin\gamma$
$A_{12} = \sin\alpha \times \cos\beta$
$A_{20} = \sin\alpha \times \sin\gamma + \cos\alpha \times \sin\beta \times \cos\gamma$
$A_{21} = -\sin\alpha \times \cos\gamma + \cos\alpha \times \sin\beta \times \sin\gamma$
$A_{22} = \cos\alpha \times \cos\beta$ In this case, the address (x, calculated by changing the variable Z according to Eq. (1) with respect to one point (X, Y) in the output buffer, and then the data D (x, y, z) are acquired sequentially from the voxel data by the use of such address. A check is executed as to whether the value of each of the data D (x, y, z) is between predetermined thresholds TH1 and TH2. If the result of such a check signifies that the data D (x, y, z) is between the two thresholds TH1 and TH2, a value (Zmax−Z) is stored at an address (X, Y) in the output buffer, wherein Zmax denotes the maximum value in the Z-axis direction. The above operation is performed repeatedly with regard to each of the entire points (X, Y) in the output buffer, whereby the volume rendering is executed in the arbitrary direction.

Figure 6:
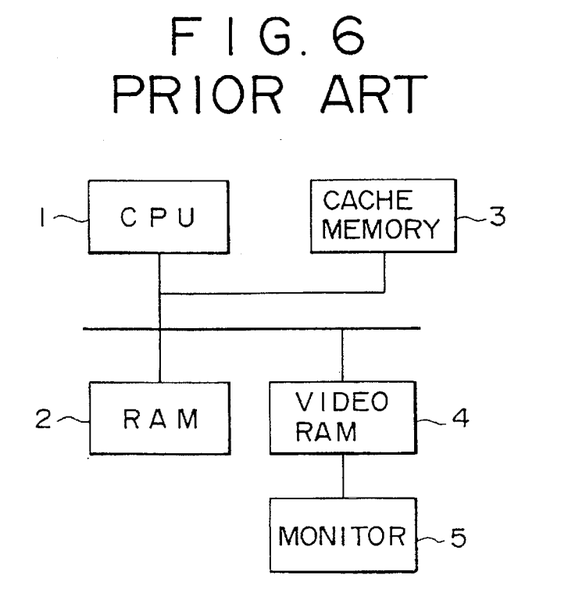
FIG. 6 is a block diagram of a conventional image processor (work station) in the related art.

It has been customary heretofore that, for execution of volume rendering from voxel data by the depth queuing method, a general-purpose computer such as a work station of FIG. 6 is employed as an image processor. In this diagram, there are included a CPU 1 serving as a controller, a dynamic RAM 2 serving as a three-dimensional memory for storing boxel data therein, a cache memory (static RAM) 3 where fast access to data is achievable, a video RAM 4 serving as an output buffer, and a monitor 5 for displaying a two-dimensional image formed by the volume rendering.

When such volume rendering is performed by the depth queuing method from voxel data, a considerably long processing time is required in the prior art due to the processes (1) to (3) mentioned below consequently raising difficulties in attaining a fast operation:

(1) It is necessary to calculate a great number of three-dimensional addresses (x, y, z) in the sight-line direction.

(2) A great amount of three-dimensional data needs to be accessed randomly.

(3) A great amount of three-dimensional data needs to be processed by the depth queuing method.

Although the processes (1) and (2) can be executed relatively simply, a long calculation time is required in each case on account of a great number of data. As to the process (2) where three-dimensional data are accessed randomly, there frequently occurs the necessity of accessing the three-dimensional data not yet transferred into the cache memory 3. It follows in this case that such access is executed to the RAM 2, whereby a long time is also required for accessing the great amount of data.

SUMMARY OF THE INVENTION

It is therefore an object of the present invention to provide an improved image processor which is capable of performing a fast operation in execution of such volume rendering from voxel data by a depth queuing method.

According to one aspect of the present invention, there is provided an image processor which is adapted for volume rendering of voxel data by a depth queuing method and comprises a three-dimensional memory for storing the voxel data, a plurality of three-dimensional address generators for generating addresses to read out the data from the three-dimensional memory, and a plurality of pixel calculators for processing the read-out data from the three-dimensional memory by the depth queuing method.

It is preferred that the three-dimensional memory consists of a fast accessible memory such as a static RAM.

In the present invention, addresses for reading out the data from the three-dimensional memory are generated by a plurality of three-dimensional address generators, and the data thus read out from the memory are processed in a plurality of pixel calculators by the depth queuing method, so that it becomes possible to shorten the required calculation time to consequently attain rapid volume rendering from the voxel data by the depth queuing method. Furthermore, due to the use of a fast accessible memory as the three-dimensional memory, the processing can be executed at a high speed.

The above and other features and advantages of the present invention will become apparent from the following description which will be given with reference to the illustrative accompanying drawings.

DESCRIPTION OF THE PREFERRED EMBODIMENT

Figure 1:
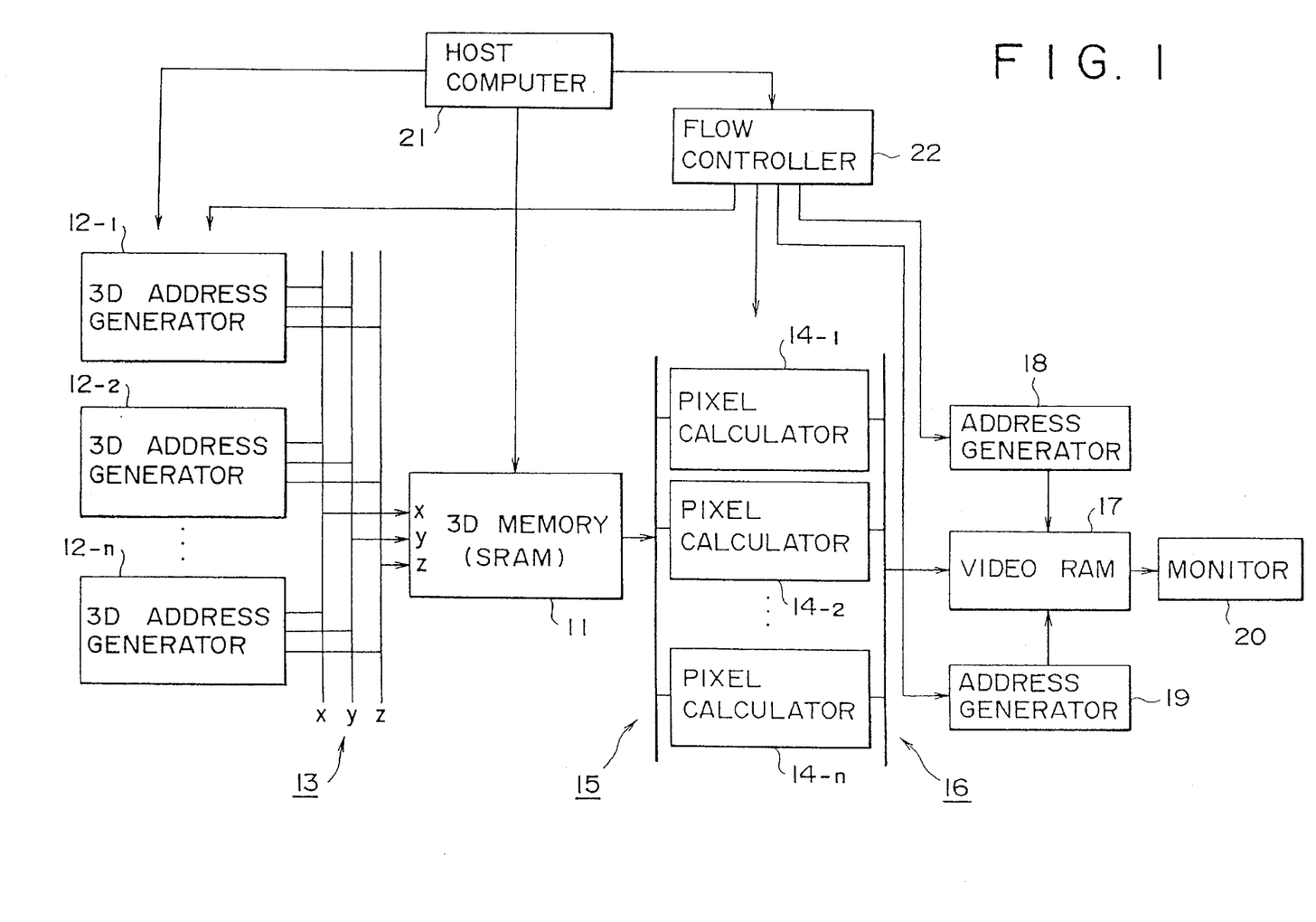
FIG. 1 is a block diagram of a preferred embodiment representing the image processor of the present invention.

Hereinafter a preferred embodiment of the present invention will be described in detail with reference to a block diagram of FIG. 1.

In this diagram, reference numeral 11 denotes a three-dimensional memory for storing voxel data (three-dimensional data) therein. This memory 11 consists of a fast accessible memory such as a static RAM. Three-dimensional address generators 12-1 to 12-n are incorporated to generate addresses for reading out the data from the three-dimensional memory 11. The addresses generated by such three-dimensional address generators 12-1 to 12-n are outputted to an address bus 13.

Figure 2:
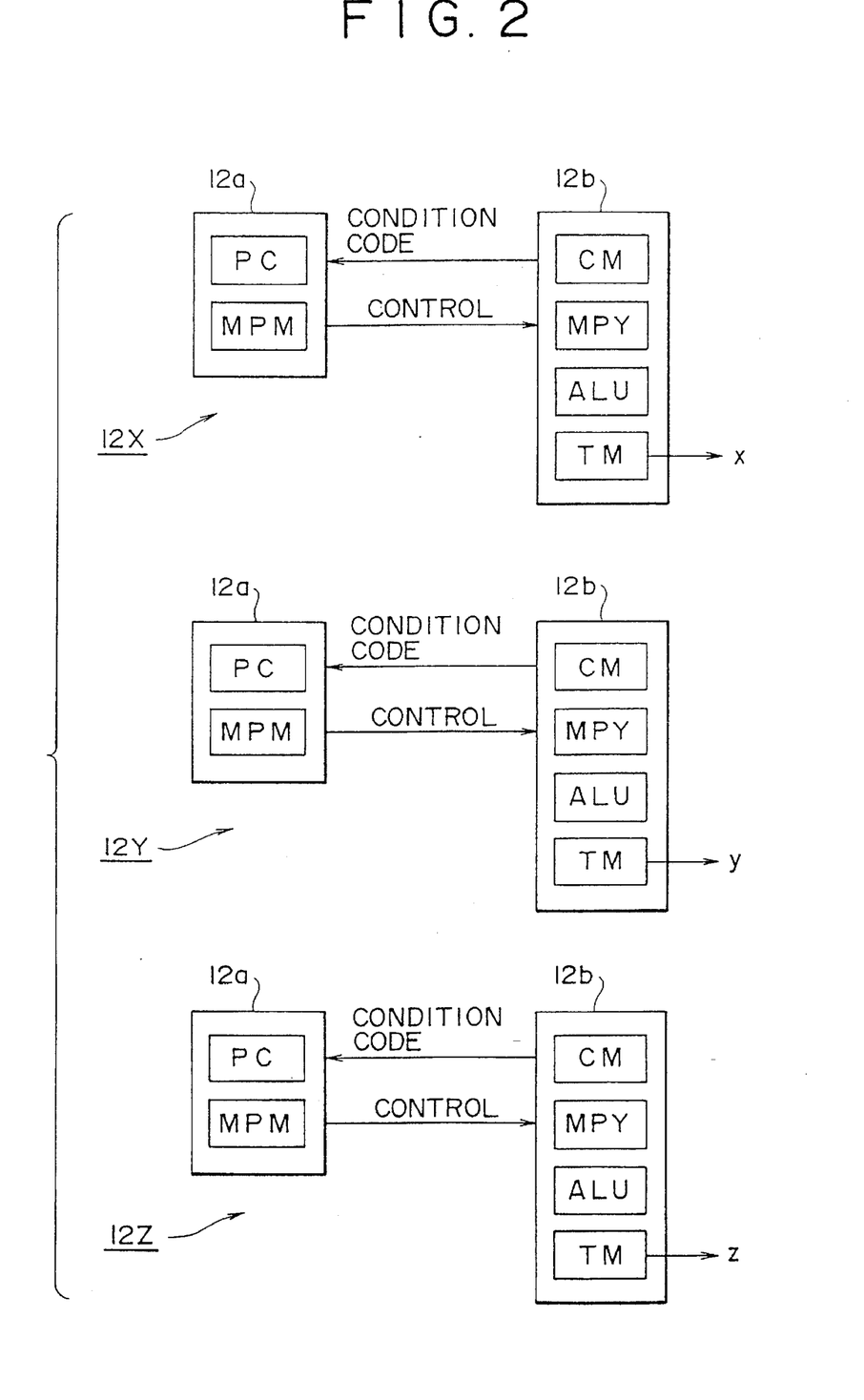
FIG. 2 is a block diagram showing constructions of three-dimensional address generators employed in the embodiment of FIG. 1.

FIG. 2 shows the individual constructions of such three-dimensional address generators 12-1 to 12-n. In this diagram, reference numerals 12X, 12Y, 12Z denote generator units for generating elemental addresses (x, y, z) respectively. Each of such elemental address generator units 12X, 12Y, 12Z is equipped with a program control circuit 12a and a calculator circuit 12b. The control circuit 12a comprises a program controller PC and a microprogram memory MPM. The calculator circuit 12b comprises a coefficient memory CM, a multiplier MPY, an arithmetic-logic unit ALU and a temporary memory (buffer) TM. The calculator circuit 12b is controlled by the control circuit 12a and supplies a condition code thereto. The respective elements of the address (x, y, z) are outputted via the temporary memory TM of the calculator circuit 12b in the address generator units 12X, 12Y, 12Z.

Referring back to FIG. 1, pixel calculators 14-1 to 14-n are provided to carry out the depth queuing method with respect to the data read out from the three-dimensional memory 11. The data obtained from the three-dimensional memory 11 are supplied via a data bus 15 to the pixel calculators 14-1 to 14-n.

Figure 3:
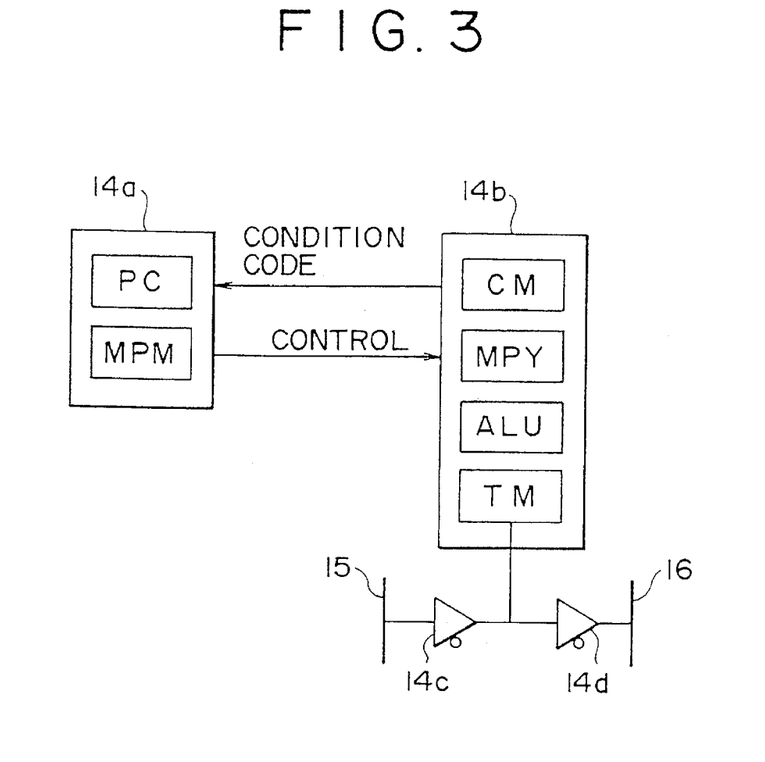
FIG. 3 is a block diagram showing a construction of a pixel calculator employed in the embodiment of FIG. 1.

FIG. 3 shows the construction of such pixel calculators 14-1 to 14-n, each of which has a program control circuit 14a and a calculator circuit 14b. The control circuit 14a and the calculator circuit 14b are respectively the same in structure as the control circuit 12a and the calculator circuit 12b in the aforementioned three-dimensional address generators 12-1 to 12-n. The input data bus 15 is connected via a buffer 14c to the temporary memory TM, to which the output data bus 16 is also connected via a buffer 14d.

Back to FIG. 1 again, reference numeral 17 denotes a video RAM where pixel signals produced as the results of the processes in the pixel calculators 14-1 to 14-n are written. This video RAM 17 serves as an output buffer. The pixel signals obtained from the pixel calculators 14-1 to 14-n are supplied via the data bus 16 to the video RAM 17. There are further included an address generator 18 which generates addresses for writing in the video RAM 17 the pixel signals outputted from the pixel calculators 14-1 to 14-n; an address generator 19 which generates addresses for reading out the pixel signals from the video RAM 17; and a monitor 20 which is supplied with the pixel signals read out from the video RAM 17 and displays a two-dimensional image produced by the volume rendering.

There are further incorporated a host computer 21 and a flow controller 22. The host computer 21 loads the voxel data in the three-dimensional memory 11, then distributes the parameters (matrix A in Eq. (1)), which are used for calculation of addresses, to the three-dimensional address generators 12-1 to 12-n, and also functions to control the flow controller 22.

The flow controller 22 distributes two-dimensional addresses (X, Y) to the three-dimensional address generators 12-1 to 12-n for calculation of addresses, then controls the three-dimensional address generators 12-1 to 12-n for outputting the addresses (x, y, z) to the address bus 13, also controls the pixel calculators 14-1 to 14-n for receiving the input data from the data bus 15, subsequently controls the pixel calculators 14-1 to 14-n for outputting the data therefrom to the data bus 16, and further controls the address generators 18 and 19.

Figure 4:
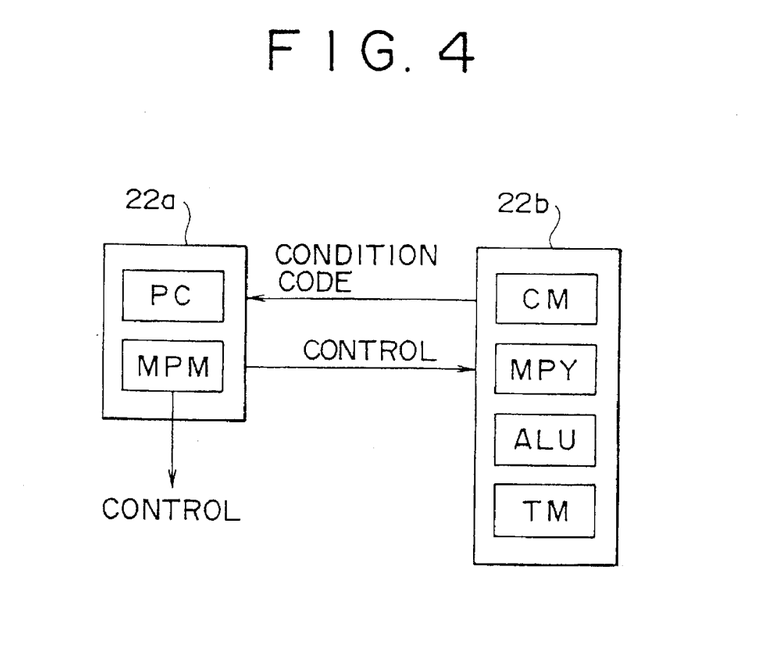
FIG. 4 is a block diagram showing a construction of a flow controller employed in the embodiment of FIG. 1.

FIG. 4 shows the construction of the flow controller 22 which is equipped with a program control circuit 22a and a calculator circuit 22b. The control circuit 22a and the calculator circuit 22b are respectively the same in structure as the control circuit 12a and the calculator circuit 12b in the aforementioned three-dimensional address generators 12-1 to 12-n. A control signal is outputted from a microprogram memory MPM included in the control circuit 22a.

In the construction described above, the following operation is performed to execute the volume rendering from voxel data by the depth queuing method.

[1] The host computer 21 loads the voxel data in the three-dimensional memory 11.

[2] The host computer 21 distributes the sight-line direction parameters (matrix A in Eq. (1)) to the three-dimensional address generators 12-1 to 12-n.

[3] The flow controller 22 sequentially supplies the addresses (X, Y) in the output buffer to the three-dimensional address generators 12-1 to 12-n.

[4] The three-dimensional address generators 12-1 to 12-n receive the addresses (X, Y) from the flow controller 22, then change the value Z from −L/2 to L/2 according to Eq. (1) to thereby generate addresses (x, y, z) of the one-line data D (x, y, z) used in the depth queuing method, and stores such addresses (x, y, z) in the temporary memory (buffer) TM (FIG. 2).

[5] Under control of the flow controller 22, the three-dimensional address generator 12-1 successively outputs the addresses (x, y, z) to the address bus 13.

[6] The three-dimensional memory 11 successively outputs to the data bus 15 the data D (x, y, z) read out in accordance with the addresses (x, y, z) obtained from the address bus 13.

[7] Any of the pixel calculators 14-1 to 14-n receives, in response to a command sent thereto from the flow controller 22, the data D (x, y, z) outputted successively to the data bus 15.

[8] The above procedure from [5] to [7] is repeatedly executed with regard to each of the three-dimensional address generators 12-1 to 12-n.

[9] The pixel calculators 14-1 to 14-n calculate the pixel signals of the addresses (X, Y) by the depth queuing method on the basis of the one-line data D (x, y, z) supplied thereto respectively.

[10] Under control of the flow controller 22, the pixel calculators 14-1 to 14-n output the pixel signals of the addresses (X, Y) to the data bus 16.

[11] The flow controller 22 controls the address generator 18 and writes the pixel signals, which are outputted from the pixel calculators 14-1 to 14-n to the data bus 16, in the addresses (X, Y) of the video RAM 17.

[12] The above procedure from [3] to [11] is repeated to process the one-picture data of the output buffer, i.e., the video RAM 17.

[13] While controlling the address generator 19, the flow controller 22 reads out the pixel signals which represent the result of the volume rendering written in the video RAM 17, and then supplies the pixel signals to the monitor 20 to thereby display a two-dimensional image formed through the volume rendering by the depth queuing method.

The display on the monitor 20 may be performed prior to termination of processing the one-picture data. In such a case, the two-dimensional image displayed on the monitor 20 is completed with the lapse of time.

In this embodiment, as described, the addresses (X, Y) on the output buffer are sequentially distributed to the three-dimensional address generators 12-1 to 12-n so that the addresses (x, y, z) for reading out the data D (x, y, z) are generated respectively in such three-dimensional address generators 12-1 to 12-n, and the data read out from the three-dimensional memory 11 in accordance with the addresses (x, y, z) generated by the three-dimensional address generators 12-1 to 12-n are processed by the depth queuing method in the pixel calculators 14-1 to 14-n respectively, whereby the required calculation time can be shortened in comparison with that in the conventional apparatus, hence achieving a high-speed operation in execution of the volume rendering from the voxel data by the depth queuing method.

In this embodiment where the three-dimensional memory consists of a fast accessible memory such as a static RAM, one-line addresses (x, y, z) stored in the temporary memory (buffer) TM of the three-dimensional address generators 12-1 to 12-n are successively supplied to the three-dimensional memory 11 so as to efficiently access the data (x, y, z) to read out the same in succession. Therefore the memory is quickly accessible to consequently accomplish a higher speed in the processing.

Although the two address generators 18 and 19 are provided for the video RAM 17 in the above embodiment, the construction may be so modified as to employ a single address generator in case a two-dimensional image is displayed on the monitor 20 after termination of processing one-picture data.

According to the present invention, as described hereinabove, addresses for reading out the data from the three-dimensional memory are generated by a plurality of three-dimensional address generators, and the data read out from the three-dimensional memory are processed in a plurality of pixel calculators by the depth queuing method, so that the calculation time can be shortened to eventually expedite the volume rendering performed from the voxel data by the depth queuing method. And due to the use of a fast accessible memory as the three-dimensional memory, it becomes possible to attain an even higher-speed operation.

What is claimed is:

1. An image processor for performing a volume rendering operation from voxel data by a depth queuing method, comprising:

a three-dimensional memory for storing the vowel data therein;

a plurality of three-dimensional address generators for generating addresses to read out the data from said three-dimensional memory; and a plurality of pixel calculators for processing the read-out data from said three-dimensional memory by the depth queuing method.

2. The image processor according to claim 1, wherein said three-dimensional memory comprises a fast accessible memory.

3. The image processor according to claim 2, wherein said three-dimensional memory comprises a static RAM.

4. An image processor for performing a volume rendering operation from voxel data by a depth queuing method, comprising:

a three-dimensional memory for storing the voxel data;

a temporary buffer;

a plurality of three-dimensional address generators for reading out the voxel data from the three-dimensional memory, generating addresses of one-line data used in the depth queuing method, storing such addresses of one-line data in the temporary memory, and outputting the one-line data addresses to the three-dimensional memory which then outputs one-line data read out from the three-dimensional memory in accordance with the one-line data addresses;

a plurality of pixel calculators supplied with the one-line data from the three-dimensional memory for calculating the pixel signals of the addresses by the depth queuing method;

a video random access memory (RAM) which serves as an output buffer;

at least one address generator which generates addresses for writing in the video RAM pixel signals outputted from the plurality of pixel calculators;

a flow controller for controlling the three-dimensional address generators and the plurality of pixel calculators; and a monitor for displaying a two-dimensional image formed through the volume rendering operation by the depth queuing method.

* * * * *

UNITED STATES PATENT AND TRADEMARK OFFICE
CERTIFICATE OF CORRECTION

PATENT NO. :   PATENT NO.: 5,625,760
DATED       :   DATED:     April 29, 1997
INVENTOR(S) :   INVENTOR(S): HIROYUKI FUJITA It is certified that error appears in the above-indentified patent and that said Letters Patent is hereby corrected as shown below:

In column 6, line 63, please change "vowel" to --voxel--;

Signed and Sealed this

Second Day of September, 1997

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,625,760
DATED : April 29, 1997
INVENTOR(S) : HIROYUKI FUJITA

It is certified that error appears in the above-indentified patent and that said Letters Patent is hereby corrected as shown below:

In column 7, line 13, please change "buffer" to --memory--.

Signed and Sealed this

Twenty-eighth Day of October, 1997

Attest:

BRUCE LEHMAN

Attesting Officer     Commissioner of Patents and Trademarks